US007232127B2

(12) United States Patent
Seelig et al.

(10) Patent No.: US 7,232,127 B2
(45) Date of Patent: Jun. 19, 2007

(54) LIGHTING SYSTEM FOR GAMING DEVICES

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 371 days.

(21) Appl. No.: 10/663,121

(22) Filed: Sep. 15, 2003

(65) Prior Publication Data

US 2004/0132522 A1 Jul. 8, 2004

Related U.S. Application Data

(60) Provisional application No. 60/411,440, filed on Sep. 16, 2002.

(51) Int. Cl.
*G06F 17/00* (2006.01)
*G06F 19/00* (2006.01)

(52) U.S. Cl. .............................. 273/143 R; 273/138.2; 463/16; 463/17; 463/18; 463/19; 463/20

(58) Field of Classification Search ............. 273/138.2, 273/143 R; 463/16–33
See application file for complete search history.

(56) References Cited

U.S. PATENT DOCUMENTS 3,195,402 A 7/1965 Hamilton
4,306,716 A 12/1981 James et al.
4,621,815 A * 11/1986 Yamamoto .............. 273/143 R
4,711,452 A 12/1987 Dickinson et al.
5,209,477 A * 5/1993 Heidel et al. ........... 273/143 R
5,284,344 A * 2/1994 Howard .................. 273/143 R
5,326,104 A 7/1994 Pease et al.
5,406,300 A 4/1995 Tokimoto et al.
5,464,213 A 11/1995 Lee et al.

(Continued)

FOREIGN PATENT DOCUMENTS

GB 2218561 11/1989

(Continued)

OTHER PUBLICATIONS

English Translation of JP 2001-353255 A, including Abstract & Detailed Description. Retrieved from JPO. [online] [retrieved Apr. 15, 2006] <URL:http://www.jpo.go.jp/>.*

(Continued)

*Primary Examiner*—Scott Jones
*Assistant Examiner*—Milap Shah
(74) *Attorney, Agent, or Firm*—Ian F. Burns

(57) ABSTRACT

A reel device for a gaming machine comprising a chassis configured to support the reel device and a reel structure attached to the chassis. The reel structure has a hub, a frame, and a spoke attached to the hub and the frame. The frame preferably defines the periphery of the reel structure. The periphery of the reel structure preferably has media adapted to display a symbol to a game player. The reel may further have a board attached to the chassis and a plurality of light-emitting diodes positioned on the board, wherein the plurality of light-emitting diodes is adapted to transmit light to at least a portion of the media.

29 Claims, 9 Drawing Sheets

U.S. PATENT DOCUMENTS

| | | | |
|---|---|---|---|
| 5,509,655 A * | 4/1996 | Ugawa | 273/121 B |
| 5,547,192 A * | 8/1996 | Ishibashi | 463/26 |
| 5,580,055 A | 12/1996 | Hagiwara | |
| 5,584,764 A | 12/1996 | Inoue | |
| 5,609,524 A | 3/1997 | Inoue | |
| 5,670,971 A | 9/1997 | Tokimoto et al. | |
| 5,752,881 A | 5/1998 | Inoue | |
| 5,836,818 A | 11/1998 | Jones et al. | |
| 6,027,115 A | 2/2000 | Griswold et al. | |
| 6,056,642 A | 5/2000 | Bennett | |
| 6,129,355 A | 10/2000 | Hahn et al. | |
| 6,206,781 B1 | 3/2001 | Sunaga et al. | |
| 6,265,984 B1 | 7/2001 | Molinaroli | |
| 6,278,419 B1 | 8/2001 | Malkin | |
| 6,315,289 B1 | 11/2001 | Sakamoto et al. | |
| 6,368,216 B1 | 4/2002 | Hedrick et al. | |
| 6,383,073 B1 | 5/2002 | Nagano | |
| 6,512,607 B1 | 1/2003 | Windsor et al. | |
| 6,612,575 B1 | 9/2003 | Cole et al. | |
| 6,811,273 B2 * | 11/2004 | Satoh et al. | 362/27 |
| 2003/0107530 A1 | 6/2003 | Motegi et al. | |
| 2003/0109304 A1 | 6/2003 | Gauselmann | |

FOREIGN PATENT DOCUMENTS

| | | |
|---|---|---|
| JP | 2001062032 A * | 3/2001 |
| JP | 2001087458 A * | 4/2001 |
| JP | 2001353255 A * | 12/2001 |

OTHER PUBLICATIONS

English Translation of JP 2001-062032 A, including Abstract & Detailed Description. Retrieved from JPO. [online] [retrieved Apr. 15, 2006] <URL:http://www.jpo.go.jp/>.*

English Translation of JP 2001-087458 A, including Abstract & Detailed Description. Retrieved from JPO. [online] [retrieved Apr. 15, 2006] <URL:http://www.jpo.go.jp/>.*

* cited by examiner

LIGHTING SYSTEM FOR GAMING DEVICES

CROSS REFERENCES TO RELATED PATENT APPLICATIONS

This application claims priority of provisional patent application Ser. No. 60/411,440, filed Sep. 16, 2002.

FIELD OF THE INVENTION

This invention relates to gaming devices and, more particularly, to a gaming device that utilizes physical reels.

BACKGROUND

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a pre-defined table to determine the outcome of the event. If the random number falls within a certain range of numbers on the table, the player may win a pre-defined prize. The table may also contain display information that allows the gaming device to generate a display that corresponds to the outcome of the game. The gaming device may present the outcome of the game on a large variety of display devices, such as mechanical spinning reels or video screens.

Reel-type gaming devices have been used in gaming for more than one hundred years. Traditional reel-type gaming devices have three mechanical reels that rotate around a common horizontal axis. A reel strip is attached around the circumference of each reel and the reel strips display a plurality of symbols. During normal operation, the reels are spun and stopped to display an outcome of the game. As each reel comes to a stop, a symbol on the perimeter of each reel strip is displayed on the front of the gaming device. Some gaming devices indicate a winning outcome by aligning pre-determined symbols on one or more pre-determined pay lines.

Gaming devices that are more interesting generate more player interest and excitement. This increased interest and excitement causes players to play longer, which results in more revenue for the game operator. For this purpose, many gaming devices utilize light to enhance their displays and to attract the attention of players. Many different kinds of lights and lighting effects have been developed for gaming devices. While lights have been used in conjunction with gaming devices, a long felt and unmet need exists for an efficient and effective lighting system for reel-type gaming devices.

SUMMARY OF AT LEAST ONE EMBODIMENT OF THE INVENTION

Advantages

The various embodiments of the present invention may, but do not necessarily, achieve one or more of the following advantages:

provide a gaming device that utilizes light emitting diodes;

provide a reel device that utilizes light emitting diodes;

provide a reel device that utilizes light emitting diodes that emit light having different wavelengths;

produces less heat than other lighting systems;

provide a lighting system that consumes less power than other gaming devices;

require less service than other lighting systems;

provide game designers more flexibility in designing games and payout events;

provide a visually distinct, but easily understood, gaming display;

provide a gaming device that adds to player excitement and satisfaction; and provide a gaming device that is interesting to a player and results in longer playing time.

These and other advantages of the present invention may be realized by reference to the remaining portions of the specification, claims, and abstract.

BRIEF DESCRIPTION OF AT LEAST ONE EMBODIMENT OF THE PRESENT INVENTION

In at least one embodiment, the present invention is directed to a reel device for a gaming machine comprising a chassis configured to support the reel device and a reel structure attached to the chassis. The reel structure has a hub and a frame. The frame preferably defines the periphery of the reel structure. The periphery of the reel structure preferably has media adapted to display a symbol to a game player. The reel may further have a board attached to the chassis and a plurality of light emitting diodes positioned on the board, wherein the plurality of light-emitting diodes is adapted to transmit light to at least a portion of the media.

In at least another embodiment, the present invention is directed to a method of awarding prizes. According to the method, a gaming device is provided that comprises at least a first mechanical spinning wheel being rotatable about an axis. The wheel has translucent media. The wheel has a board mounted inside, the board comprising a plurality of light emitting diodes. A game outcome is determined. The wheel is rotated, at least a portion of the wheel being viewable by a player. At least a portion of the light emitting diodes are illuminated. The mechanical wheel is stopped according to the game outcome. A prize is awarded to the player if the game outcome is a winning event.

The above description sets forth, rather broadly, a summary of one embodiment of the more important features of the present invention so that the detailed description of certain embodiments of the invention that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF AT LEAST ONE EMBODIMENT OF THE PRESENT INVENTION

In the following detailed description of certain embodiments of the present invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Gaming Device

Figure 1:
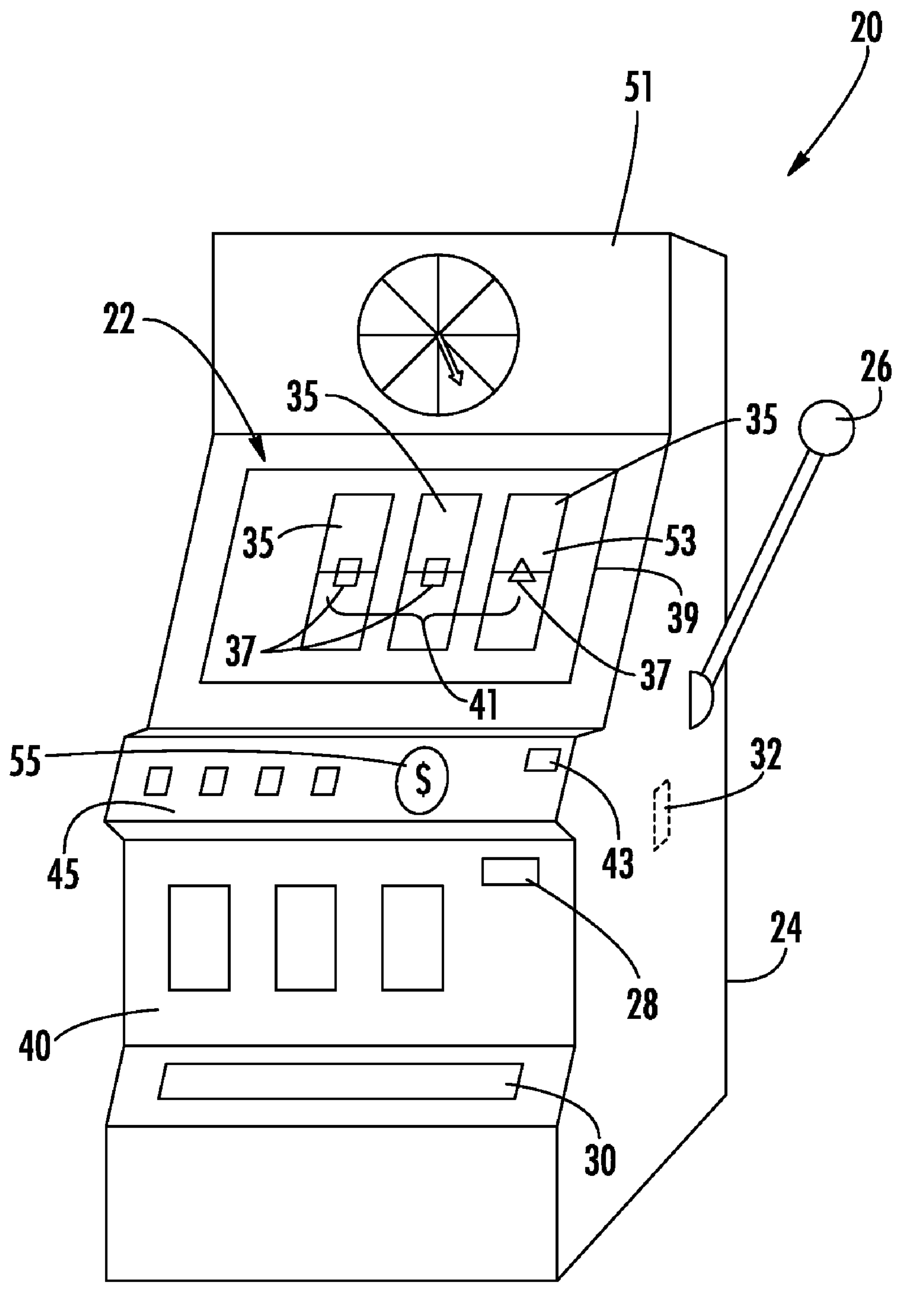
FIG. 1 is substantially an isometric view of a gaming device that utilizes a spinning reel display.

The present invention comprises a lighting system for use with a gaming device. FIG. 1 illustrates a reel-type gaming device 20 known in the art. Gaming device 20 may comprise a case or housing 24, a reel-type game display 22, having a plurality of display sections 35, a handle 26, a value acceptor 28, a coin bin 30, and a game controller 32.

Although display 22 is shown with three display sections 35, a greater or lesser number of sections may be used. At least one symbol or indicium 41 per reel can be displayed to a player, or multiple indicia 41 on each reel can be displayed to a player. For example, a 3×3 matrix of 9 indicia 41 could be displayed. In certain embodiments, each display section 35 displays one reel 37. Alternatively, more or fewer reels could be displayed per display section 35. Display sections 35 could be omitted and all reels 37 displayed in display area 22.

In at least one embodiment of the present invention, each reel 37 has a plurality of indicia 41 appearing on the outer surface of the reel. The combinations of indicia 41 displayed to the player determine winning and losing combinations. A pay line 39 may be added to the display to aid the player in seeing the alignment of indicia 41 used to determine whether the player has won.

Case 24 may hold gaming device components. A value acceptor 28 may accept various forms of value, including cash and coins, from a game player. The value acceptor may accept tokens, paper currency, magnetic cards, and vouchers. A coin bin 30 may hold coins that may be dispensed after a winning event has occurred.

Gaming device 20 may include wager input means, such as buttons 45, for a player to input a wager to be played on a particular round of game play. Handle 26 may be used by the game player to initiate play on gaming device 20. Handle 26 may be pulled by the game player to start the game. Other input devices, such as a button 43, may also be provided for initiating play.

Once a game is activated, reels 37 spin or rotate around a common, usually horizontal, rotational axis (not shown). Controller 32 determines a game outcome and causes reels 37 to display the appropriate symbols or indicia 41 in sections 35. A winning combination or arrangement of symbols 41 preferably corresponds to a display on pay table 40. If the combination determined by controller 32 is a winning outcome, the player is awarded a prize.

Display area 22 may comprise a primary game. Gaming device 20 may also include a bonus game 51. The bonus game may be triggered by a bonus activating event, as is known in the art, such as the display of a particular symbol 53 on reel 37. The bonus game may entitle a player to such prizes as additional monetary prizes, goods and/or services, or a bonus multiplier by which a player's winnings are multiplied. The bonus game may be activated by a separate input device, such as button 55, or could be activated by the same means used to activate the primary game, including input device 41 and/or handle 26.

Figure 2:
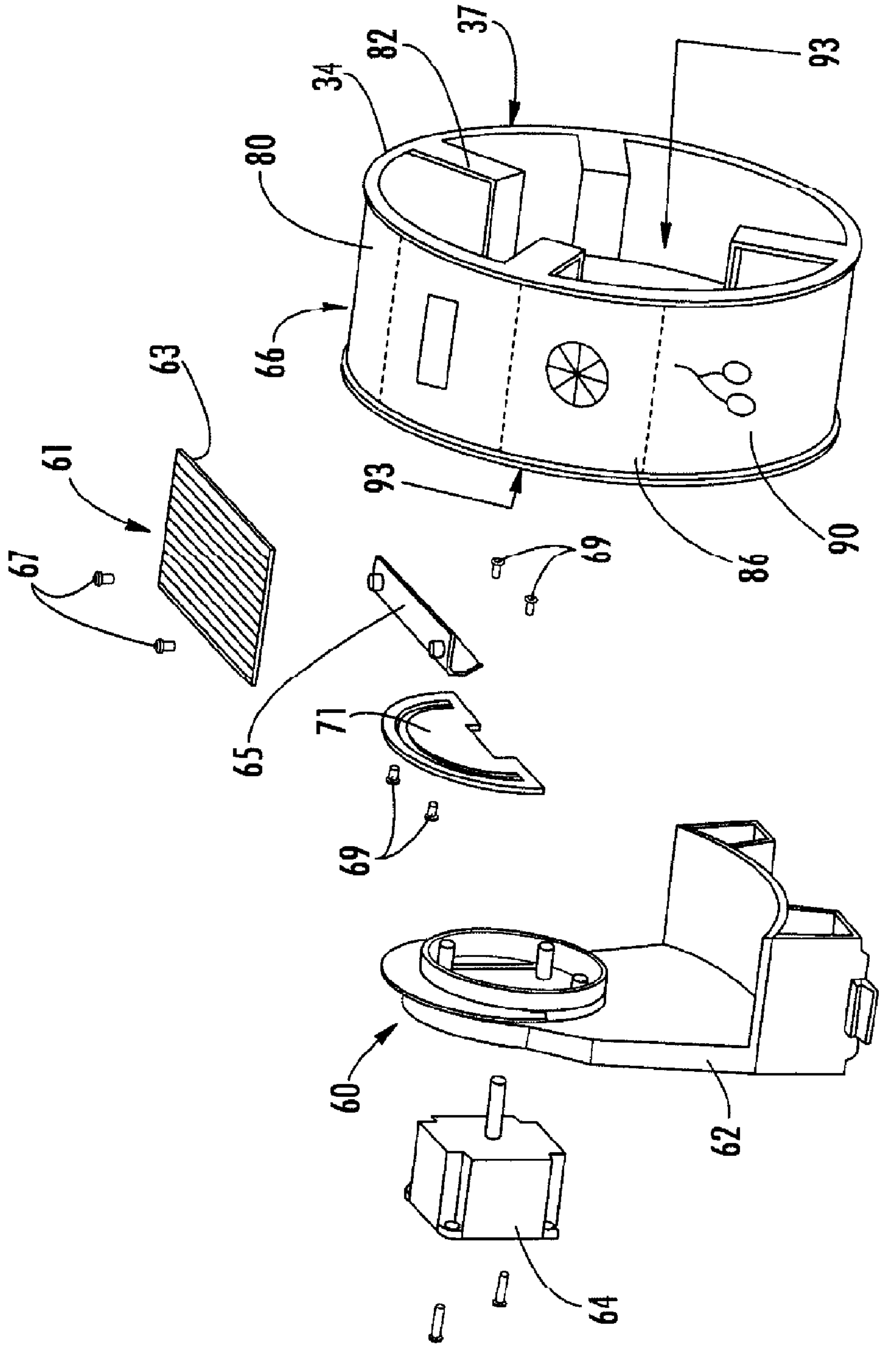
FIG. 2 is substantially an exploded view of an embodiment of a lighting system of the present invention.
Figure 3:
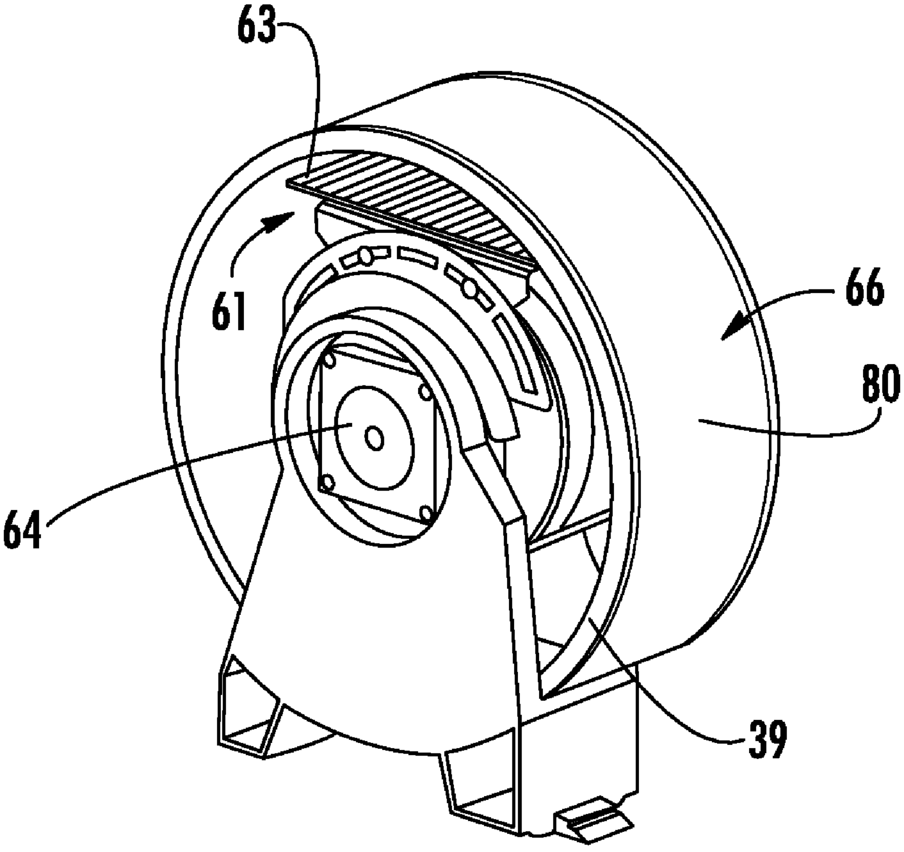
FIG. 3 is substantially a perspective view of the lighting system of FIG. 2.

FIGS. 2 and 3 show a reel device 60. Reel device 60 may comprise a chassis 62, a reel light assembly 61, and a reel 37 rotatably attached to the chassis 62. Reel 37 may have a hub (not shown) and a frame. The frame may define the periphery of reel 37 and a reel circumference 66. Reel 37 may further have at least one spoke 82. A media strip, or reel strip, 80 may be attached to reel circumference 66. Media strip 80 may have sections 86 showing various types of images, such as symbols 90.

Media strip 80 may be attached by various types of adhesives. Alternatively, the frame of reel 37 may be constructed to hold media strip 80. For example, the outer portion of the frame may be formed into slots configured to hold media strip 80. Of course, other means of attachment could be used without departing from the scope of the present invention. Media strip 80 may be made of any suitable material, including plastic films and the like. It may be desirable for at least a portion of media strip 80 to be at least partially translucent, in order to allow light to pass through. Of course the extent and degree of translucency, transparency, or opacity may be selected as desired by the art worker and still fall within the scope of the present invention.

The present invention is not limited to reels 37 containing media strips. For example, reels 37 may be constructed so that a portion functioning similarly to media strip 80 is integrally formed in reels 37. In addition, media strip 80, or its equivalent, is not limited to any particular shape or size. Media strip 80, or its equivalent, may be mounted to a face side 93 of reel 37. Media strip 80, or its equivalent, need not extend the entire length of circumference 66 or cover the entire face 93 of reel 37.

Reel light assembly 61 may have a board 63. Board 63 may be attached to chassis 62 by a bracket 65 or other fasteners known in the art. Connectors 67 and 69, which may be screws, pins, or other connectors known to the art, affix board 63 to bracket 65. Bracket 65 attaches to a bracket base 71, which attaches to chassis 62. Board 63 may be positioned underneath media strip 80. Board 63 may be positioned to face the front of display 22 (FIG. 1).

Figure 4:
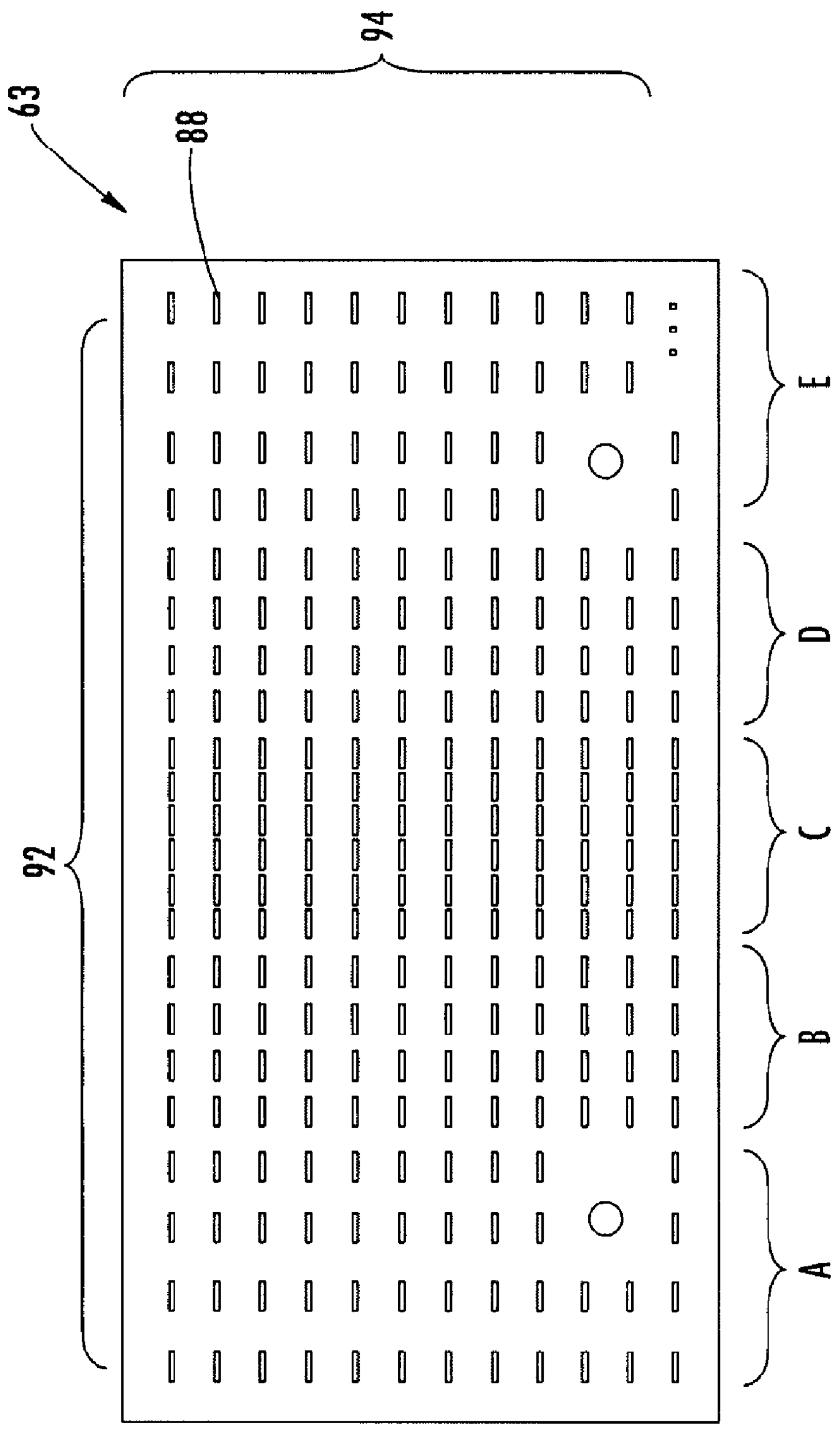
FIG. 4 is substantially a front elevational view of an LED board.
Figure 5A:
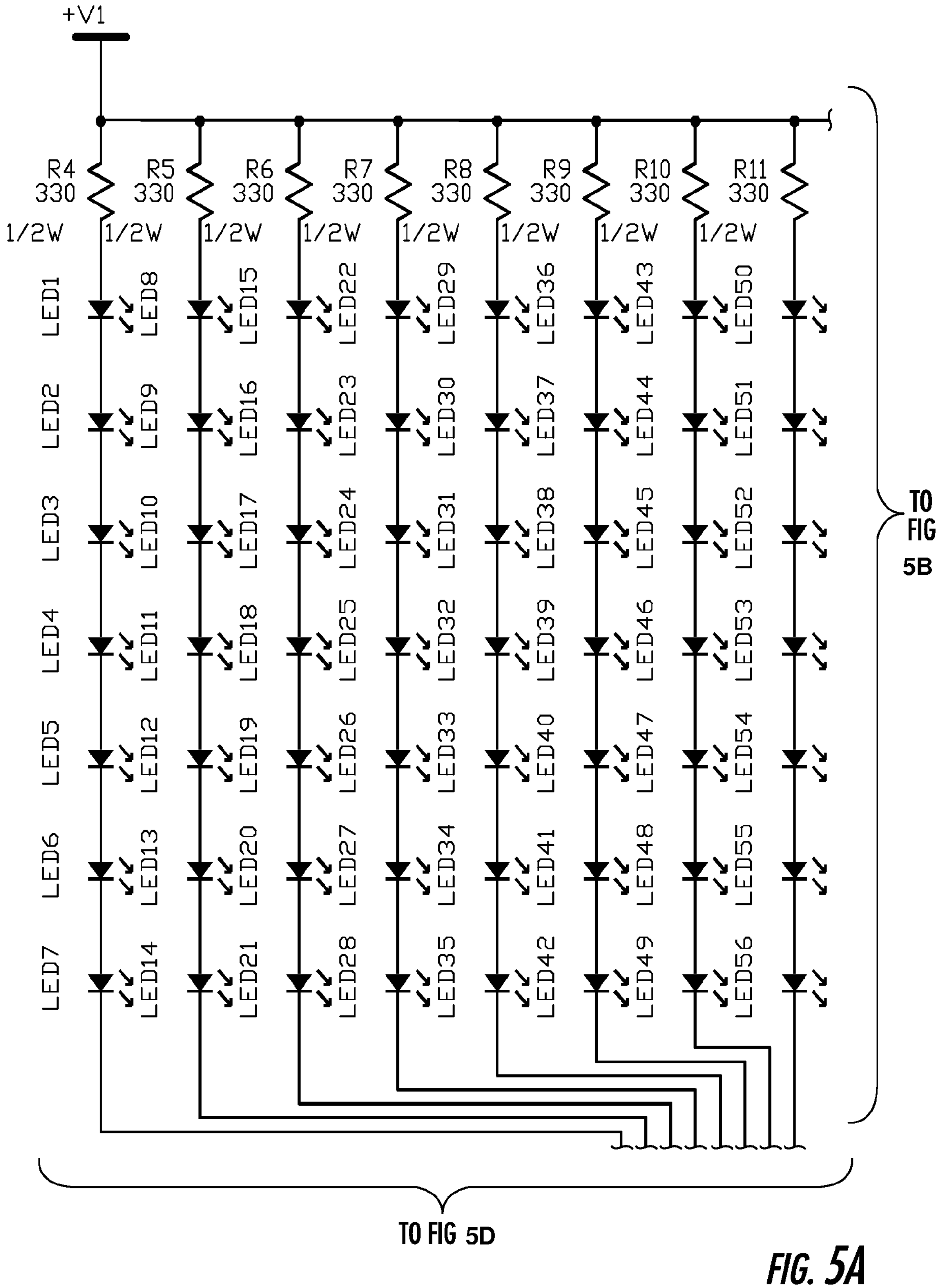
FIGS. 5A-5E are substantially schematic diagrams of an electrical circuit for driving the light emitting diodes.
Figure 5B:
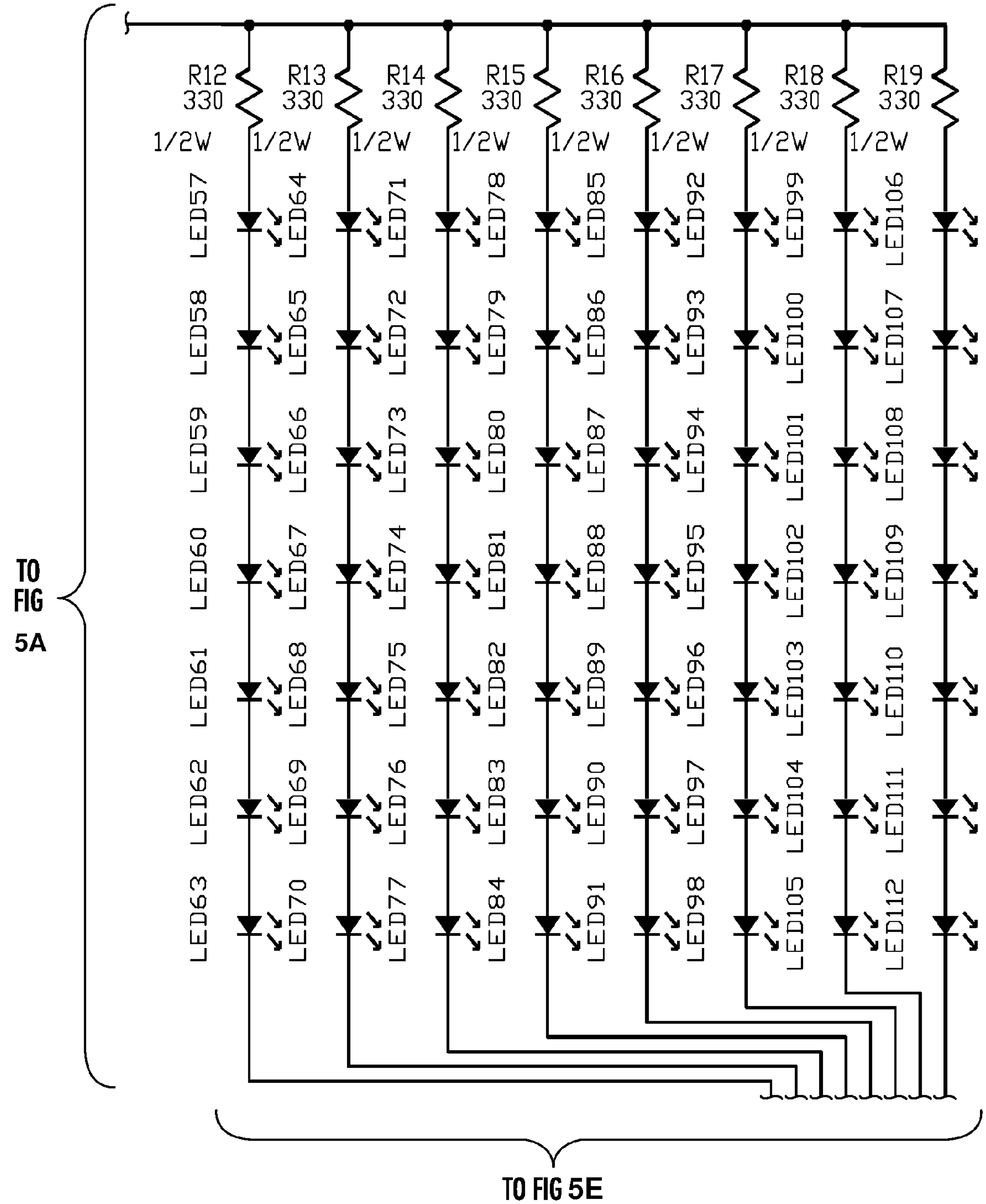
Figure 5C:
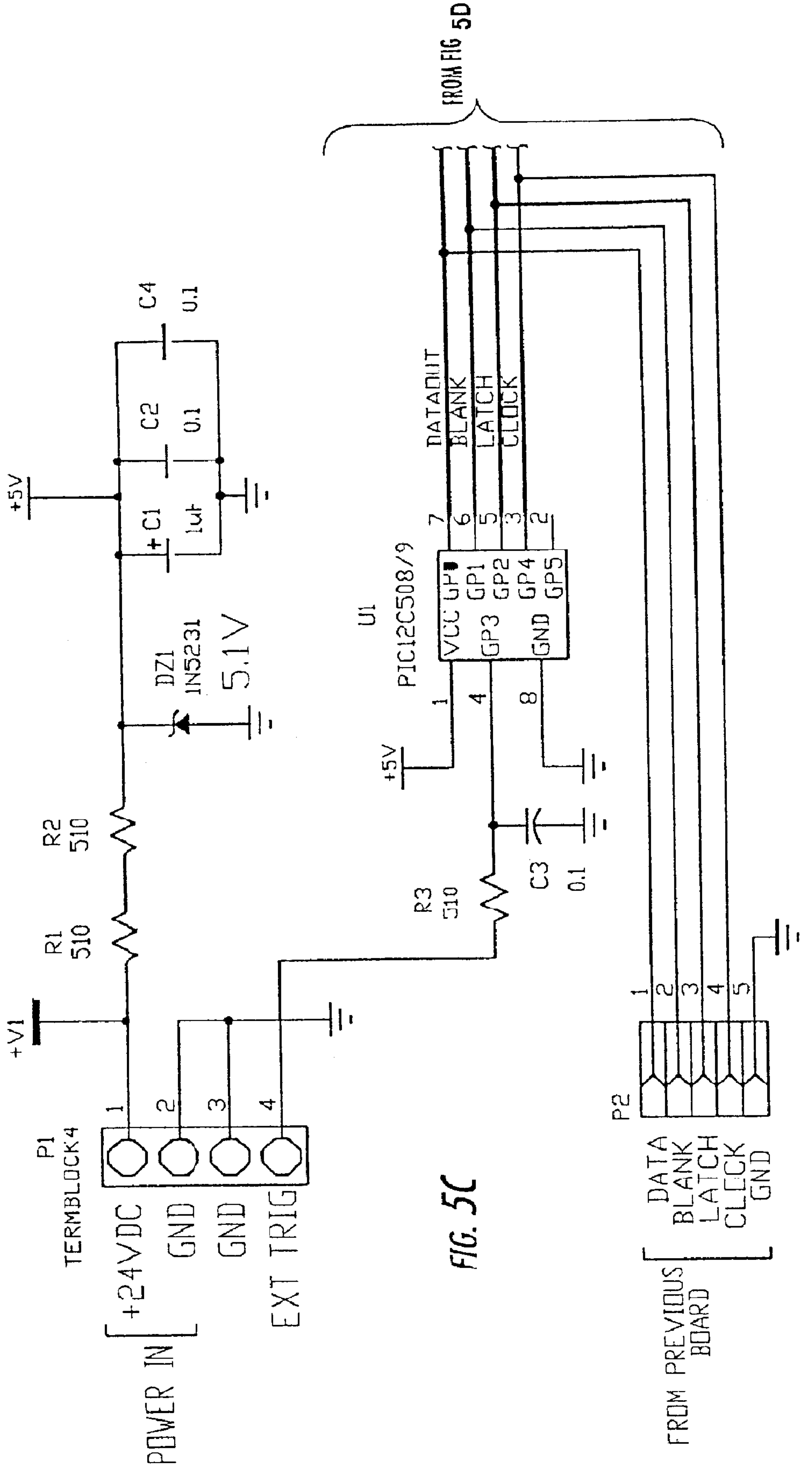
Figure 5D:
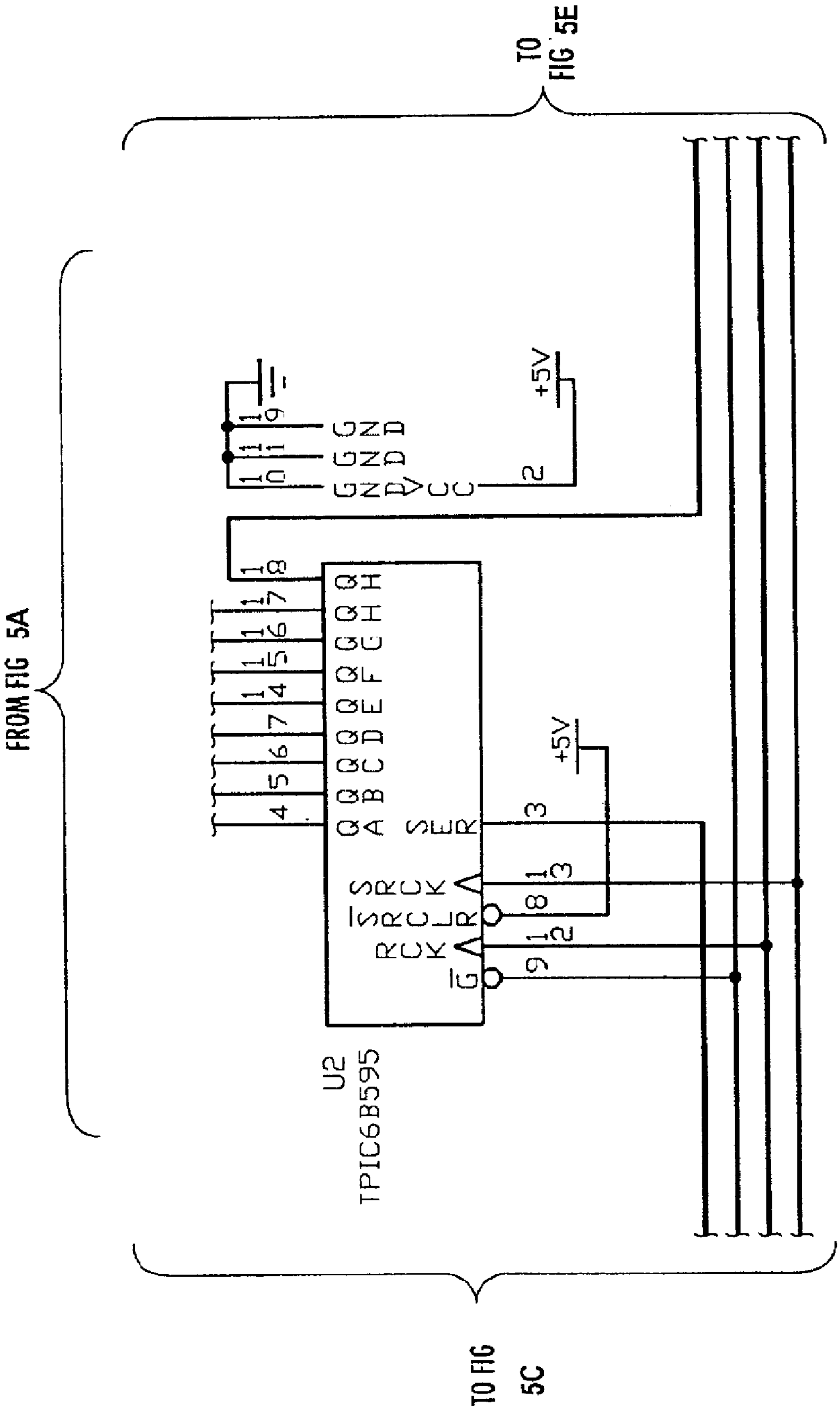
Figure 5E:
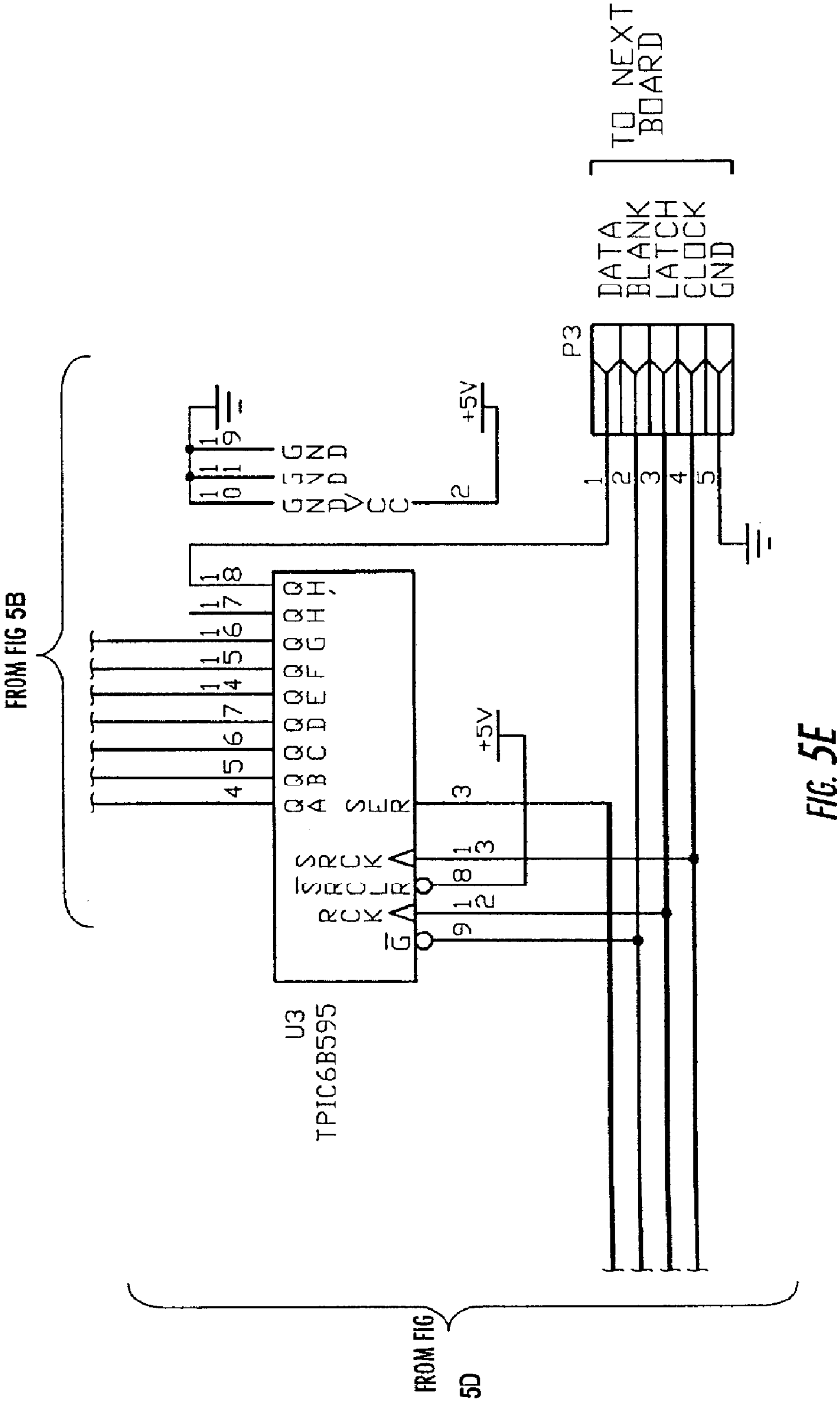

Referring now to FIG. 4, board 63 may be adapted to hold a plurality of light-emitting diodes (LEDs) 88. LEDs 88 may shine light on media strip 80 (of FIGS. 2 and 3), and may provide a variety of visual presentations and effects on media strip 80. LEDs 88 may be selected to emit light in several different wavelengths, resulting in different colors of light. LEDs 88 may be individually illuminated by a power source or may be illuminated together. LEDs 88 may be directed to illuminate or display a letter, a symbol, a number, a character, or other indicia or images. LEDs 88 can be made to flash or create other visual effects. LEDs 88 suitable for use in the present invention may be commercially available from LED Effects, Inc., Rancho Cordova, Calif.

LEDs 88 may be arranged in rows 92 and columns 94 to define a matrix. Board 63 may be divided into matrix portions A through E. Matrix portions A through E may have varying densities of LEDs 88. For example, portion C may have the highest density of LEDs 88, portion B may have an intermediate density of LEDs 88, and portion A may have a comparatively lower LED 88 density.

Arrangements and numbers of LEDs 88 may vary. Densities of LEDs 88 may vary, and positions and sizes of matrix portions may vary. Increased LED density may allow for brighter displays. In addition, higher LED densities may allow for more detailed displays to be presented to a player. By combining regions of higher and lower LED density, a variety of display options are available. Arrangements of LEDs and densities of LEDs may be configured according to a desired display or visual effect on media strip 80. With LEDs, because of the great variety of options in selecting and configuring the quantity, types, colors, densities, arrangements, and other variables, visual effects or presentations may be conducted in a smooth and visually appealing manner.

LEDs emit light with substantially less radiant heat than fluorescent or incandescent light sources. Creating a matrix of incandescent bulbs, or other non-LED light sources, may generate inappropriate levels of heat that could damage other game components. In addition, LEDs use less power that other light sources and may reduce the game proprietor's overhead expenditures. Similarly, LEDs typically last longer and are more durable than other light sources, including fluorescent lights. This durability and longevity may reduce the amount of money spent on replacement parts, service calls, and revenue lost due to out of service machines.

The LEDs used in the present invention may emit light at a single wavelength or, preferably, at multiple wavelengths. Obviously, the type of LEDs used may have a significant impact on the construction and operation of LED board 63. For example, if single color LEDs are used, an appropriate number of LEDs of each desired color need to be placed on the surface of board 63, crowding the surface and limiting the brightness and resolution of any one color. If LEDs are used that can emit light at multiple wavelengths, the LED density can be configured without regard to color, the color of each LED being controllable by a controller, such as controller 32 (shown in FIG. 1).

LEDs for use in the present invention may be conventional LEDs, such as those made from indium gallium arsenide or gallium nitride. Organic light-emitting diodes (OLEDs) may also be used, particularly when it is desired to have LEDs capable of emitting at multiple wavelengths. Those of skill in the art will be able to select appropriate LEDs for use in a particular application, as well as to design LED boards having appropriate configurations of LEDs.

Conductive regions (not shown) are preferably provided on board 63 for supplying electrical current to LEDs 88. These regions may be provided using printed circuit board technology that is well known in the art. These conductive regions can be arranged so that individual LEDs can be activated. Alternatively, the conductive regions may be arranged to activate individual rows or columns of LEDs.

Referring back to FIGS. 2 and 3, a reel motor 64 (FIG. 3) may also be provided on chassis 62 for rotating reel 37. Reel motor may be any motor typically used in gaming machines, other suitable motors known in the art, or subsequently developed motors. In at least one embodiment, motor 64 is a stepper motor. Reel motor 64 is typically connected to controller 32 (shown in FIG. 1) to controllably stop the reel rotation.

Controller 32 may be in communication, including being electrically connected, with LED board 63, and therefore the light emitting diodes 88, by a cable or wire harness (not shown). Controller 32 may provide the necessary voltage to cause the light emitting diodes to emit light. Controller 32 may also cause different light emitting diodes to emit light at different times. For example, a blue LED can be on for one time period, then a green LED for a second time period and then a red LED for a third time period. The different time periods may be sequential, overlapping, or simultaneous. In addition, when multiple wavelength LEDs are used, controller 32 may control the wavelength at which each LED emits. Of course, controller 32 could control a secondary controller that would directly control LEDs 88 in response to signals received from controller 32. A suitable controller for this use is a GAM 2000 controller manufactured by Eagle Engineering of Pottstown, Pa. Of course, many other controllers, now known or yet to be developed, could be used without departing from the scope of the present invention.

Turning now to FIGS. 5A-5E, schematic diagrams of at least a portion of one embodiment of controller 32 and board 63 is shown. Controller 32 may be adapted to control the operation of the light emitting diodes 88. Controller 32 may comprise integrated circuits U1, U2, and U3, and a power supply 120. Integrated circuits U2 and U3 are 8-bit shift registers. U2 and U3 contain an 8-bit serial-in, parallel-out shift register that feeds an 8-bit D-type storage register. Integrated circuit U1 is a 4-bit microcontroller. Integrated circuits U2 and U3 are connected to the matrix 126 of LEDs 88. Resistors R4-R19 are connected between each row of the LEDs and 24 volts DC. Microcontroller U1 may be programmed to turn on rows of LEDs 132 in a pre-determined sequence for a predetermined period of time. Controller 32 may be chained together to control more matrices 126 of LEDs using connectors P2 and P3. A connector P1 provides a connection from the microcontroller U1 to power, ground, and an external trigger. Power supply 120 provides power to integrated circuits U1, U2, and U3.

Controller 32 may provide the necessary voltage to cause the light emitting diodes to emit light. Controller 32 may also allow different color LEDs to emit light at different times. As media strip 80 is rotated with reel 37 (shown on FIG. 2), controller 32 (of FIG. 1) may selectively illuminate various LEDs 88.

Methods of Using Backlit Reels

Backlighting reels 37 using LED board 63 provides many possibilities for developing new gaming devices and methods. These possibilities range from using LEDs in place of traditional light sources, using LEDs to create interesting lighting and "animation" effects, and using colored LEDs in gaming methods.

LED Illumination

In at least one embodiment, backlit reels 37 may be used to create an LED illuminated version of a typical slot machine display. That is, the media strip located on the reels may be made of a material that transmits light from the LEDs in the center of the reels through to the outside of the reels (i.e. media strip 80 is translucent, to some degree). Media strip 80 may have a plurality of different sections 86, each section bearing a symbol or indicia 90.

As has already been discussed, using LEDs to illuminate reels 37 has many advantages over more traditional light sources, such as incandescent bulbs. The advantages include lower heat production and lower energy consumption. Another advantage is the longevity and durability of LED lights.

Lighting Effects and Animation

The nature of the LED lights allows for much greater variety in how illumination is used in the gaming device and how it can be incorporated into gaming methods. As has already been discussed, LED board 63 may have varying densities of LEDs. The LEDs can be arranged on board 63 to create desired lighting effects. For example, lower LED densities may be used at the edges of board 63 and higher densities at the middle, allowing symbols 90 on media strip 80 to appear to fade in and out of view.

It is possible to create custom illumination patterns to illuminate media strips 80, or even create illumination patterns that are tailored to each symbol 90. For example, if a particular indicium 90 has a particular shape, such as the number "7," LEDs 88 could be set to illuminate in the pattern of a "7." This custom illumination creates a visually distinct look for the gaming apparatus and draws more attention to the symbols appearing on media strip 80.

As another example, many gaming machines contain special symbols that indicate a jackpot prize, a bonus prize, a progressive prize, or a symbol 90 entitling a player to play a bonus game. The ability to win these special prizes is often a key motivation for players to play a particular gaming machine. It may be desirable to highlight the special symbol or symbols that award these prizes.

One way attention can be drawn to special symbols is by adjusting the illumination level of LED board 63 depending on what symbol 90 is being displayed to the player. A standard symbol might be displayed at a first illumination level. A symbol entitling a player to play a bonus round might be illuminated at a second illumination level that is brighter than the first illumination level. A jackpot or progressive prize might be illuminated at a third, brighter illumination level.

In addition to custom display patterns and custom illumination levels, LED board 63 can be used to add "animation" type effects to the game display. For example, when the number "7" is displayed, LEDs 88 could be made to illuminate from the bottom of the "7" to the top. Symbol 90 might be made to appear to flash.

These animations can be independent of an underlying game or can be tied to game events. For example, if the combination of three "7"s results in a jackpot prize, a first "7" appearing on a pay line might appear at a first illumination level, a second "7" might cause both "7"s to be more brightly illuminated, while a winning combination of three "7"s may be made to appear to flash. In addition, animated effects may be configured to display over more than one reel. For example, an animation might appear to start on one reel and carry over to another reel.

Colored LEDs

In place of, or in addition to, the previously mentioned uses of LED lights 88, LED board 63 may include a variety of colored LEDs 88, or have LEDs 88 emitting at multiple wavelengths, and can create additional game play possibilities and opportunities to create a visually distinct gaming machine. In one embodiment, LED board 63 might be configured to display different colors as media strip 80 rotates with reel 37. The changing colors need not be correlated to any gaming function or be associated with a particular game outcome. Compared to traditionally illuminated machines, the changing colored display has a visually unique appearance and may attract and retain game players.

The colors displayed by LEDs 88 may be correlated to various game play factors. For example, media strip 80 may include a variety of symbols 90, the meaning of which may be influenced by the colors displayed by LEDs 88. In one embodiment, symbols 90 appearing on media strip 80 are substantially uncolored, such as being white or clear. As a non-limiting example, media strip 80 may contain one or more symbols 90 that are "7"s and are a translucent white when un-illuminated. When the game or a certain reel is not active, the symbols may appear to be white.

When a game is initiated, a random number generator associated with controller 32 may determine the outcome. The outcome may indicate the "7" appearing on center reel 37 will be red. As reels 37 rotate, LEDs 88 may alternate the color of one or more "7"s appearing on media strip 80 associated with center reel 37. In this way, a player does not know what the color of the "7" will be at the game's conclusion, creating an element of suspense. When center reel 37 is stopped, LEDs 88 will display the color initially determined as the outcome by controller 32, in this case, the "7" displayed by center 37 would be illuminated red.

In the above embodiment, the player would be see an uncolored, possibly un-illuminated display. Once game play has begun, reels 37 may be illuminated a variety of colors. At the games conclusion one color may be solidly illuminated for each reel. The solidly illuminated color corresponds to the game outcome.

It should be noted that a variety of images 90 can be used on media strip 80, or merely different colors or presentations of one image. For example, a game may be developed where winning and losing combinations are determined by various combinations of colored symbols.

Color could also indicate things such as multiplier values. In one embodiment, the color displayed by LEDs 88 may be tied to the number of credits played by a player in a particular game round. For example, it is common for payout amounts to be tied to the number of credits played by a player. A one credit wager may result in a 1× payout, two credits may result in a 2× payout, three credits may result in a 3× payout, etc. In addition, certain jackpot prizes are often only obtainable by playing the maximum credits on the device. A normally lighted display might be used for a 1× multiplier, a green display for a 2×, multiplier, and a red display for a 3×, or maximum, multiplier. The use of such a color scheme provides information to the player while also creating a unique look for the gaming device. Of course, the above example is merely illustrative and the present invention is not limited to indicating multiplier values, much less any particular multiplier value or color scheme.

Some bonus games award the player a multiplier by which their prize is multiplied. Color can be used for these multipliers in an analogous manner to that described for coin based multipliers.

Some gaming devices allow a player to choose to play multiple pay lines. For example, some slot machines have three reels which may each display three symbols, resulting in a three by three matrix. Pay lines can be provided along the various rows, columns, and diagonals of the matrix. Color can be used in at least two different ways, explained below.

First, color can be used to show which pay lines are active. In one embodiment, media strips 80 are white, or otherwise transparent or translucent, such that the images appearing on media strips 80 are not substantially visible when they are not being illuminated by LED board 63. When a particular pay line is in play, the portion of LED board 63 illuminating symbols along the pay line can be activated. When multiple pay lines are active, each pay line may be presented in a different color to aid the player in determining wining combinations.

In addition, or alternatively, color can be used at the conclusion of a game round in order to help the player identify pay lines that have resulted in a winning event. For example, while the reels are spinning, all of the LEDs may be lit white. When the reels stop, winning pay lines could be illuminated in red.

In an alternative embodiment, representations formed by lighting selected LEDs 88 on LED board 63 can substantially or totally replace symbols 90 on media strip 80. For example, media strip 80 could be a substantially translucent white film and may have a plurality of different sections. As media strip 80 is rotated about LED board 63, LED lights 88 may project light onto media strip 80, forming a variety of images and preferably imitating a traditional spinning reel.

Color may also be used to indicate that a player is entitled to a bonus, or is entitled to play a bonus game. For example, the appearance of an uncolored symbol might indicate a non-winning event, or a normal payout. The game may be configured such that the appearance of the same symbol, but displayed in a particular color, entitles the player to a bonus award or to play a bonus game. Of course, the bonus could also be triggered by a colored symbol in combination with other colored or uncolored indicia appearing on other reels.

It will be appreciated those in the art that the present invention is advantageous because it greatly increases the range of options available to game designers. Previously, game designers would typically need to include more reels, display more symbols, or add additional display elements in order to add new elements or additional winning combinations to gaming devices. Although the games may serve to increase player interest, there is always the possibility that too complicated a presentation might actually discourage players from playing the games. By using a relatively simple, easily assimilated game modification—color—many new game play elements can be added to a relatively simple gaming device, increasing the variety of game play options available to a player, while maintaining a coherent presentation.

The following is an example of how color can increase the flexibility of a game. On a mechanical slot machine having 22 indicia per reel, and three reels, there are a total of 10,648 different combinations of symbols. The addition of just one color increases the number of indicia per reel to 44 (22 indicia, each possibility appearing in one of two colors) and the total number of combinations to 85,184. The addition of the extra colors may allow game operators to create relatively large prizes with relatively small odds of occurring. Of course, a greater number of smaller payouts may be included. The color displayed by LED lights 88 may be determined by a random number generator associated with controller 32.

Of course, many different variations of the present invention may be used without departing from the scope of the invention. For example, different combinations of colors, animation effects, and LED lighting could be used. All reels could be similarly illuminated, or different illumination schemes could be used for each reel. Similarly, the methods and apparatus of the present invention may find application in areas beyond gaming, and for gaming machines other than reel type slot machines.

CONCLUSION

The present invention solves many problems associated with the prior art and fulfills many currently unmet needs. The present invention provides a gaming device having reels that utilize light emitting diodes. Certain embodiments of the present invention provide a reel device that utilizes light emitting diodes that emit light in different wavelengths. Certain embodiments of the present invention reduce the amount of power consumed and the heat produced by lighting systems.

Although the description above contains many specifications, these should not be construed as limiting the scope of the invention but as merely providing illustrations of certain embodiments of this invention. Thus, the scope of the invention should be determined by the appended claims and their legal equivalents rather than by the examples given.

What is claimed is:

1. A reel device comprising:
(A) a chassis;
(B) an actuator attached to the chassis;
(C) a reel structure rotatably attached to the chassis, the reel structure comprising:
(a) a hub;
(b) a frame defining the periphery of the reel structure, the periphery of the reel structure comprising media adapted to display a symbol to a game player;
(D) a board attached to the chassis; and
(E) a plurality of light emitting diodes positioned on the board, wherein the plurality of light emitting diodes is adapted to transmit light to at least a portion of the media, the plurality of light emitting diodes being more densely spaced in one portion of the board than another portion of the board.

2. The reel device of claim 1, the reel structure further comprising a spoke attached to the hub and frame.

3. The reel device of claim 1, wherein at least a portion of the plurality of light emitting diodes emit different colors than another portion of the plurality of light emitting diodes.

4. The reel device of claim 1, wherein the plurality of light emitting diodes may be illuminated individually.

5. The reel device of claim 1, wherein the plurality of light emitting diodes may form illuminated numbers, characters, symbols or letters.

6. The reel device of claim 1, wherein the light emitting diodes comprise a indium gallium arsenide or gallium nitride light emitting diode.

7. The reel device of claim 1, wherein the light emitting diodes comprise an organic light emitting diode.

8. The reel device of claim 1, further comprising a controller in communication with the light emitting diodes, wherein the controller selectively illuminates the light emitting diodes.

9. The reel device of claim 8, wherein at least a portion of the light emitting diodes emit light at more than one wavelength of emission being selected by the controller.

10. The reel device of claim 1, wherein the more densely spaced light emitting diodes are used to convey a game outcome.

11. The reel device of claim 1, wherein the more densely spaced light emitting diodes transmit brighter light to the media.

12. A reel device comprising:
(A) a rotatable reel;
(B) media attached to the rotatable reel;
(C) an actuator coupled to the reel, the actuator configured to rotate the reel;
(D) a controller, the controller in communication with actuator and configured to cause the actuator to rotate the reel in accordance with a random game outcome; and
(E) a plurality of light emitting diodes in communication with the controller and positioned proximate the media, the plurality of light emitting diodes adapted to transmit light on at least a portion of the media, the plurality of light emitting diodes being arranged in variable densities proximate the media, wherein the transmission of light on the media at least partially conveys the random game outcome.

13. The reel device of claim 12, wherein the media is at least partially transparent.

14. The reel device of claim 12, wherein the media is at least partially translucent.

15. The reel device of claim 12, wherein the media has an outer surface and an inner surface and is configured to transmit light from the inner surface to the outer surface, wherein the light emitting diodes are positioned to transmit light to the inner surface of the media.

16. The reel device of claim 12, wherein the reel rotates about the light emitting diodes.

17. The reel device of claim 12, wherein the media is disposed about the circumference of the reel.

18. The reel device of claim 12, wherein the media comprises a plurality of indicia.

19. The reel device of claim 12, wherein the more densely spaced light emitting diodes are used to convey the random game outcome.

20. The reel device of claim 12, wherein the more densely spaced light emitting diodes transmit brighter light to the media.

21. A reel device comprising:

(A) chassis means;

(B) reel means mounted with the chassis means for displaying a media;

(C) actuator means connected with the reel means for moving the reel means; and (D) light means mounted proximate the reel means for illuminating the media, the light means having a first portion of lights having a first density and a second portion of lights having a second density.

22. The reel device of claim 21, wherein the light means further comprises a third portion of lights having a third density and a fourth portion of lights having a fourth density.

23. The reel device of claim 21, wherein the light means further comprises a printed circuit board and a plurality of light emitting diodes mounted on the printed circuit board.

24. The reel device of claim 23, wherein the first portion of lights correspond to a first area on the printed circuit board and the second portion of lights corresponds to a second area on the printed circuit board.

25. The reel device of claim 21, further comprising controller means in communication with the light means for controlling illumination of the light means.

26. The reel device of claim 21, wherein the media includes a plurality of indicia, at least one of the indicia conveying a game outcome.

27. The reel device of claim 21, wherein the light means are mounted adjacent the reel means such that light can be transmitted through the media.

28. The reel device of claim 21, wherein the first and second density of lights are used to at least partially convey a game outcome.

29. The reel device of claim 21, wherein the first density of lights are more closely spaced and the second density of lights are less closely spaced.

* * * * *